United States Patent [19]

O'Reilly

[11] 4,407,142
[45] Oct. 4, 1983

[54] HEAT RECOVERY

[75] Inventor: Kevin G. O'Reilly, Hyde, England

[73] Assignee: Hall & Kay Engineering Limited, Hyde, England

[21] Appl. No.: 304,460

[22] Filed: Sep. 22, 1981

[51] Int. Cl.³ .......................................... F25B 27/02
[52] U.S. Cl. .................................................. 62/238.6
[58] Field of Search ................ 62/238.6, 238.7, 324.4; 237/2 B

[56] References Cited

U.S. PATENT DOCUMENTS

| 2,102,940 | 12/1937 | Buchanan | 62/238.6 X |
| 3,188,829 | 6/1965 | Siewert et al. | 62/238.6 X |
| 3,989,183 | 11/1976 | Gustafsson | 62/238.6 X |
| 4,254,630 | 3/1981 | Geary | 62/238.6 |
| 4,293,093 | 10/1981 | Raymond et al. | 62/238.6 X |
| 4,316,367 | 2/1982 | Yaeger et al. | 62/238.6 |
| 4,321,797 | 3/1982 | Yaeger et al. | 62/238.6 |

FOREIGN PATENT DOCUMENTS

| 2468084 | 5/1981 | France | 62/238.6 |
| 2071834 | 9/1981 | United Kingdom | 62/238.6 |

Primary Examiner—Lloyd L. King
Attorney, Agent, or Firm—Alan H. Levine

[57] ABSTRACT

Known systems for recovering heat from refrigeration plant make no distinction between the different kinds of heat being recovered and use both low and high grade heat together to raise the temperature of say a water tank. The present invention provides a system in which low grade heat i.e. recovered latent heat is recoverable for low temperature heating loads, separately from superheat energy for high temperature loads. The system includes a countercurrent heat exchanger located between the condenser and compressor of a refrigeration plant, heat engine or like device recovered superheat from the exchanger being conducted to high temperature load and recovered latent heat from the exchanger being led to a low temperature load by heat transfer medium circulated through the heat exchanger and loads by a pump.

10 Claims, 3 Drawing Figures

HEAT RECOVERY

This invention relates to the recovery of heat energy and more particularly, but not exclusively the recovery of heat energy from a refrigeration plant, a heat engine or the like.

It is, of course, well known that heat energy is produced in the process of refrigeration. This heat energy is derived from the heat removed from the refrigerated enclosure itself including items therein such as food and from the work done to compress the refrigerant during the refrigeration cycle. The same principle is used to obtain heat by means of a heat engine.

The heat energy developed in the refrigeration system or heat engine consists of the latent heat acquired by the refrigerant during evaporation thereof and "superheat" which is the heat acquired by the evaporated refrigerant and which raises the temperature of the evaporated refrigerant above its boiling point.

The heat from a refrigeration system or heat engine is generally recovered by a heat exchanger so that it can be used for example for heating water, a domestic or industrial hot water supply or space heating. However, the superheat element represent only about 15% of the total heat energy so that a good deal of heat, albeit low temperature, is not recovered by this system.

According to the present invention there is provided a heat recovery system for a refrigeration plant, heat engine or like device, said system comprising a heat exchanger adapted to be fitted between a compressor and a condenser in a refrigeration plant heat engine or like device, said heat exchanger including a first part for recovery of superheat from the refrigerant and a second part for recovery of latent heat from the refrigerant, said first part being adapted to supply heat to a high temperature heating load fluid-containing tank and the second part being adapted to supply heat to a low temperature heating load and means for circulating a fluid heat transfer medium between said heating loads and said heat exchanger.

In one embodiment of the invention the heat exchanger is arranged to operate in countercurrent with the refrigerant discharged from the compressor, and the heating load is a water tank for supply of hot water, for example for washing. Water from the bottom tank is pumped through the heat exchanger. The major part of the circulating water is returned to the mid portion of the tank after having acquired latent heat from the refrigerant and the remaining smaller part of the circulating water is returned to the upper part of the tank after having picked-up superheat from the refrigerant. In this way the low grade latent heat is used to lift the temperature of water in the tank from ambient to something approaching the boiling point of the refrigerant while the high grade superheat is substantially all employed in raising the temperature of the water above the boiling point of the refrigerant.

With the invention, therefore, the superheat energy is used much more effectively than in the prior art system. In many prior art systems only a small amount of latent heat energy is recovered and therefore some of the superheat energy is used to raise the temperature of the water from ambient to the boiling point of the refrigerant. It must be remembered that only the high grade superheat can be used to lift the temperature of the water above the boiling point of the refrigerant. Thus superheat energy used as in the prior art system to raise the temperature of the water from ambient to the boiling point of the refrigerant is no longer available for raising the temperature of the water above the boiling point of the refrigerant and is to that extent being squandered. In the present invention considerably more latent heat is recovered and the superheat is substantially all used to raise the temperature of the water above the boiling point of the refrigerant.

The heating loads may be integral such as the upper and lower parts of a water tank as mentioned above or they may be separate. For example a water tank being a high temperature load and space heaters forming a low temperature load. Separate heating loads may if desired be interconnected for example so that heat transfer medium leaving the high temperature load is circulated through the low temperature load before being returned to the heat exchanger.

Specific embodiments of the invention will now be described by way of example with reference to the accompanying drawings in which.

In the different figures like parts of the various embodiments have the same reference numerals.

Figure 1:
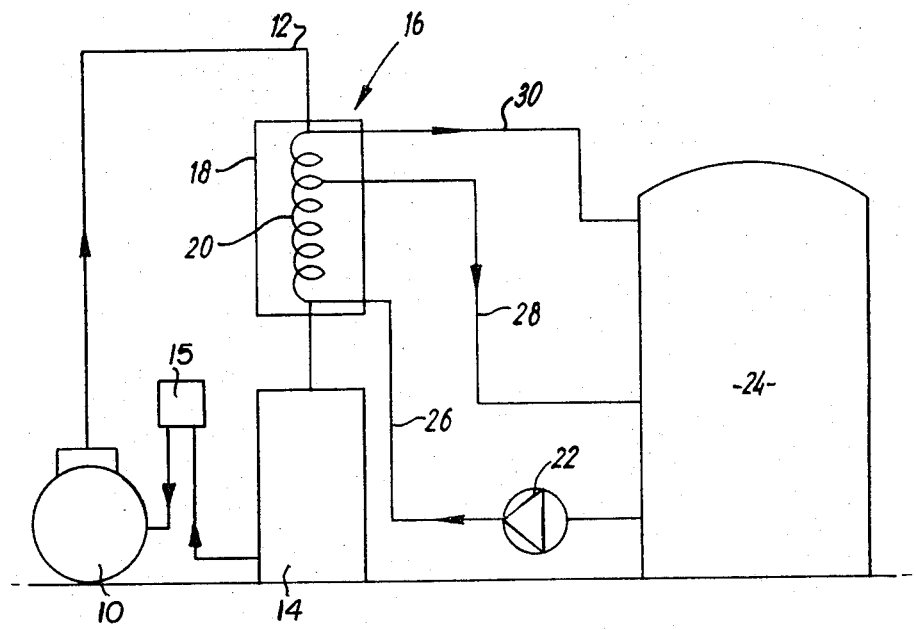
FIG. 1 is a diagrammatic representation of a heat recovery system and part of a refrigeration system.

Referring to FIG. 1 of the drawings a compressor 10 of a refrigeration plant discharges refrigerant through line 12 to a condenser 14. The liquid refrigerant is led from the condenser 14 to an evaporator 15 and back to the compressor 10 to complete the cycle. Between the compressor and condenser a heat exchanger 16 is located. The heat exchanger includes a housing 18 containing a jacketed coil 20, packed in thermal insulation (not shown). Refrigerant from the compressor is introduced into the top of the heat exchanger coil and is led from the bottom thereof to the condensor 14.

Water to be heated is pumped by a pump 22 from tank 24 through line 26 from the bottom of the tank to the bottom of the heat exchanger coil. A part of the stream of water through the heat exchanger is tapped off by line 28 and returned to the tank 24, about half way up. The remainder of the water stream is taken off the top of the heat exchanger by line 30 and returned to tank 24 near the top thereof.

It is intended that the heat removed by the tap 28 should be the latent heat the superheat being stripped off the refrigerant as it enters the heat exchanger by the remaining part of the water stream in the upper part of the heat exchanger. The position of the tap is selected having regard inter alia to the rate of flow of refrigerant and water through the heat exchanger and the heat energy in the refrigerant both of these variables being controllable by valves. In the ideal arrangement only superheat is obtained from the line 30 at the top of the heat exchanger and only latent heat from line 28. In practice there may be a small amount of overlap.

In the system just described the latent heat energy raises the temperature at the bottom of the tank 24 from ambient to just below the boiling point of the refrigerant. The water so warmed rises in the tank to the upper part thereof where the temperature is lifted by the recovered superheat fed in by line 30 to a temperature above the boiling point of the refrigerant. As the water heats up in the tank the amount of latent heat recovered progressively falls until only superheat is recovered.

Eventually, if there is no draw-off the whole tank will be warmed up substantially to the temperature of the refrigerant admitted to the heat exchanger.

When water is withdrawn from the system for example for washing then cold water make-up introduced into the tank lowers the water temperature at the bottom of the tank and re-starts recovery of the latent heat energy and possibly superheat energy for re-heating the bottom part of the tank. If the draw-off also lowers the temperature of water in the upper part of the tank then at least some superheat energy is removed by the upper part of the heat exchanger to bring the upper part of the tank up to temperature. Any remaining superheat energy is available for heating the bottom part of the tank. All this is accomplished without any special temperature control valves. It will be understood, however, that the system will be provided with valves for setting the flow of water therethrough and with shut-off valves.

The practical effect of the system according to the invention is that the water in the tank can be heated very much more quickly than by prior art systems. If, therefore, there is a regular heavy demand for hot water the present invention can accommodate that better than can the prior art systems.

The heating loads need not be comprised in a single unit such as a water tank as disclosed in the embodiment of FIG. 1. The invention can be used with separate heating loads and one such example is illustrated diagrammatically in FIG. 2. In that embodiment the upper part of the heat exchanger is connected through valve 30 to a heating coil 32 in a hot water tank 34. The lower part of the heat exchanger is connected through valve 36 to a space heating load shown diagrammatically at 38. The outlet from the heating coil 32 is connected to the low temperature heating circuit at 40 between valve 36 and the load 38. Pump 22 circulates water as heat transfer mediums through the heat exchanger and the heat loads 32 and 38.

Figure 2:
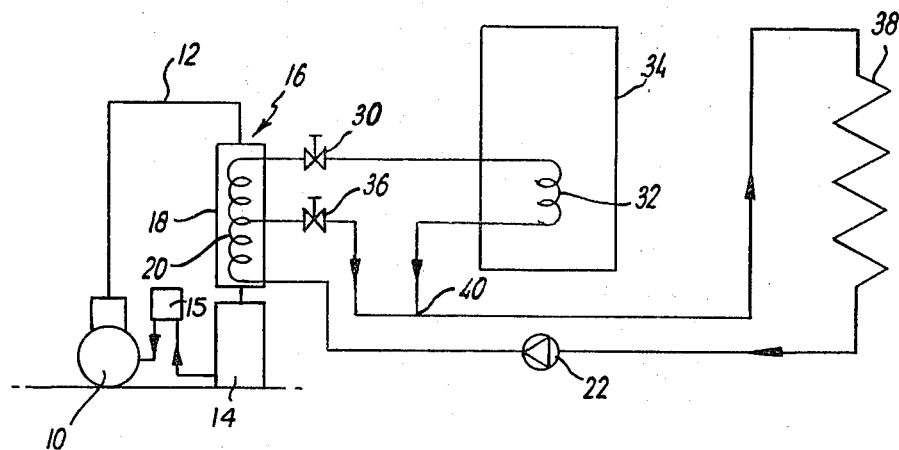
FIG. 2 is a diagrammatic representation of another embodiment of the heat recovery system.

The operation of the system of FIG. 2 is somewhat similar to that of FIG. 1. Superheat energy is taken from the top of the heat exchanger and used to heat water in the tank 34. Latent heat energy is removed from the lower part of the heat exchanger and conducted to the load 38 which may comprise, for example, radiators. As the water tank heats up surplus superheat energy from coil 32 is added to the latent heat energy taken from the heat exchanger. When the tank is upto temperature virtually all the superheat energy is available for load 38. A draw-off from tank 34 is replaced by cold water which lowers the temperature and re-starts a demand for superheat energy.

If load 38 brings the space to be heated up to required temperature, then there will be no demand for latent heat energy. It will be noted that such a condition is quite independent of any demand for heat by the high temperature load. A fall in air space temperature will re-start the recovery of latent heat and additionally any superheat that is not at that moment required by the tank.

Figure 3:
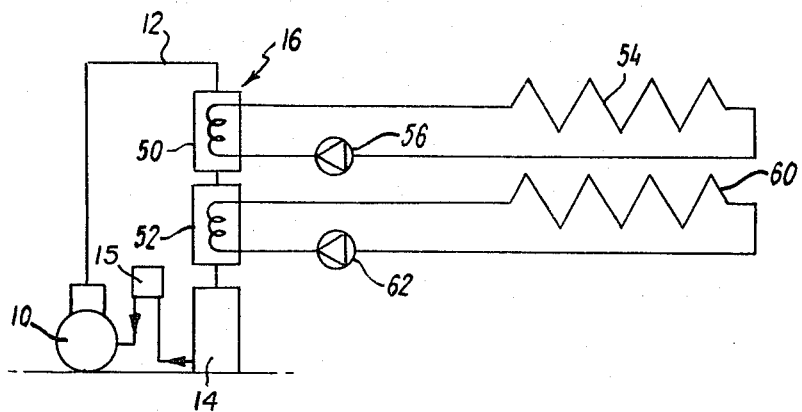
FIG. 3 is a diagrammatic representation of yet a further embodiment of the heat recovery system.

The heating loads need not be interconnected but can be separate as shown for example in FIG. 3. In that embodiment it is necessary that the two parts of the heat exchanger 50 and 52 for recovery of superheat and latent heat energy respectively should also be separate. The upper part 50 of the heat exchanger is connected to a heating load 54 and a pump 56 is provided for circulating heat transfer medium such as water between the heat exchanger part 50 and load 54. The lower part 52 of the heat exchanger is connected to a heating load 60 and pump 62 is provided for circulating heat transfer medium such as water between the part 52 of the heat exchanger and load 60.

The embodiment of FIG. 3 operates in a manner which is similar to that of FIGS. 1 and 2. Thus a demand by load 54 will be met by superheat energy removed in part 50 of the heat exchanger. A demand by load 60 will be met by latent heat energy obtained from part 52 of the heat exchanger.

Although their is no direct interconnection between the two heating circuits, nevertheless any surplus superheat energy from the high temperature circuit will be available in the heat exchanger and will be removed in part 52, for use in the low temperature circuit. Thus if there is no demand by load 54 both latent heat and superheat are available for load 60. A demand or absence of demand by load 60 has no appreciable effect on the operation of the high temperature circuit.

It will be understood that the above embodiments are only examples and many variations can be made. Thus the high temperature and low temperature circuits may themselves be subdivided into separate circuits which may be directly interconnected, or not, as desired.

Moreover although the embodiments have been described with reference to a refrigeration system, the invention can be used with other devices which produce heat energy that consists of both latent heat and superheat. A particularly advantageous use of the invention is in connection with, so called, heat engines. Heat engines are, in effect, refrigeration plants which are used to extract heat from ambient air for example out side a building and supply it to the building for heating purposes. Many kinds of heat engines are only designed to supply heat upto relatively low maximum temperatures, for example not exceeding about 50° C. By using the present invention in combination with such a heat engine hot water at upto about 70° C. can be obtained.

Some heat engines are designed to supply hot water at very much higher temperatures for example upto 160° F. (71.1° C.). The present invention allows savings to be made in that a heat engine designed to supply water at say 120° F. (48.9° C.) i.e. a cheaper installation can be used in combination with the present invention to supply at least some water at 160° F. (71.1° C.). In other words the application of the present invention to heat engines of varying kinds extends the range and usage of such heat engines and in many cases enables considerable economies in plant to be achieved.

I claim:

1. A heat recovery system for a refrigeration plant, a heat engine, or like apparatus, such apparatus having a compressor for moving a superheated refrigerant to and through a condenser, the heat recovery system comprising:

a heat exchanger means operatively arranged between the compressor and the condenser, so that the refrigerant flows through the heat exchanger means, two heating loads, one of the loads being at a higher temperature than the other, means for circulating a fluid heat transfer medium between the higher temperature load and a first part of the heat exchanger means for transfering superheat from the refrigerant to the higher temperature load, and additional means for circulating a fluid heat transfer medium between the lower temperature load and a second part of the heat exchanger means for transferring latent heat from the refrigerant to the lower temperature load.

2. A heat recovery system as claimed in claim 1, wherein the heat exchanger means is arranged to operate in countercurrent with refrigerant discharged from the compressor.

3. A heat recovery system as claimed in claim 1 wherein the high temperature heating load and low temperature heating load are interconnected.

4. A heat recovery system as claimed in claim 3 wherein the high and low temperature loads are integral.

5. A heat recovery as claimed in claim 4, wherein the high temperature load is the upper part of a water tank and the low temperature load is the lower part of said tank.

6. A heat recovery system as claimed in claim 5 wherein the said second part of the heat exchanger means is connected to supply recovered latent heat to the tank substantially at the middle thereof.

7. A heat recovery system as claimed in claim 3, wherein the high temperature heating load is a water tank and the low temperature load comprises space heating.

8. A heat recovery system as claimed in claim 1, wherein the high temperature heating load is separate from said low temperature heating load, a separate pump in each circulating means being provided for circulating heat transfer medium between the heat exchanger and the high and low temperature loads respectively.

9. A heat recovery system as claimed in claim 1 wherein said circulating means includes a pump.

10. A heat recovery system, as claimed in claim 1 wherein the division of said heat exchanger into first and second parts is adjustable.

* * * * *